SHIFT REGISTER COMPARATOR

Filed Jan. 20, 1967 4 Sheets-Sheet 1

INVENTOR.
RICHARD L. SNYDER
BY
Roland A. Anderson
ATTORNEY

INVENTOR.
RICHARD L. SNYDER

BY
Roland A. Anderson

ATTORNEY

March 31, 1970 R. L. SNYDER 3,504,341

SHIFT REGISTER COMPARATOR

Filed Jan. 20, 1967 4 Sheets-Sheet 3

INVENTOR.
RICHARD L. SNYDER

BY

ATTORNEY

March 31, 1970 R. L. SNYDER 3,504,341

SHIFT REGISTER COMPARATOR

Filed Jan. 20, 1967 4 Sheets-Sheet 4

INVENTOR
RICHARD L. SNYDER
BY
Roland A. Anderson
ATTORNEY

United States Patent Office 3,504,341
Patented Mar. 31, 1970

3,504,341
SHIFT REGISTER COMPARATOR

Richard L. Snyder, New Smyrna Beach, Fla., assignor to the United States of America as represented by the United States Atomic Energy Commission Filed Jan. 20, 1967, Ser. No. 610,700
Int. Cl. G06f *7/22*; H03k *5/20*
U.S. Cl. 340—146.2 4 Claims

ABSTRACT OF THE DISCLOSURE

This invention relates to a digital information comparator using a magnetic shift register in which an unknown pattern of digital information is compared with a known or standard pattern. One embodiment comprises two magnetic shift registers between which are placed a plurality of magnetometers which measure like and unlike magnetic fields in corresponding portions of the magnetized wire containing patterns of magnetic domains. A second embodiment comprises a single magnetic shift register with a comparator or pulse difference measuring circuit, a recycling circuit to retain the known or standard pattern and a read-out circuit.

The invention disclosed herein was made in the course of, or under, Contract AT(29–1)-789 with the United States Atomic Energy Commission.

This invention relates to devices for comparing digital information, and in particular, to binary digital information comparators incorporating magnetic shift registers.

Although digital information comparators have many applications, they are particularly useful for selecting and detecting addresses of storage registers in the memory systems of digital computers, i.e., magnetic tapes, drums, discs, etc., which are repeatedly scanned by appropriate detecting means common in the art. Each memory storage register, i.e., a finite length of track on the tape, drum, disc, etc., is normally given a separate address consisting of a coded set of binary bits of information in a patterned sequence of 1 or 0 bits. During repeated scanning of the register addresses in the memory, patterns of binary bits of information representing individual addresses of separate registers are compared with a given or standard pattern of binary bits of digital information representing the address of the particular register desired by the operator in the memory storage portion of the computer. When the two patterns of binary information match, a signal is generated or other indication is made, i.e., lack of signal, to show that the particular register address has been found. The operator may then direct that some function be performed, such as reading out the information stored, erasing the stored information, adding additional information, or the like.

Comparison of more complex information is required in pattern recognition systems such as character readers and radar echo identification systems. In these systems, variable amounts of information may be handled. In some instances, matching of only parts of a sequence of signals may be required. In other instances, where noise may degrade one or both of the signals to be compared, a degree of matching rather than complete correspondence may be important.

Digital information comparators of the prior art generally utilize electron tube circuits, transistor circuits, or magnetic amplifier circuits, connected in the well known bistable "flip flop" configuration. By serially connecting the number of flip flop circuits and displaying the polarity of each pair of bistable elements, a pattern of 0 and 1 bits of binary information can be treated. Then, comparing the polarities of two sets of flip flop units, the patterns of binary digital information can be compared.

Because of their high power consumption, electron tubes employing heated cathodes are seldom used. Transistors have certain inherent instabilities, among other limitations, which require special compensating circuitry. The major disadvantage of any of the register systems in which bits of information are stored in multiple element circuits are the limitations represented by cost, maintenance requirements, space and weight requirements of such systems to assemblies capable of handling a few hundred, or at most a few thousand, bits. Thus, the prior art systems, if designed to compare digital information upward to a capacity of millions of bits, would be impractical when compared to the information comparator of the present invention. In addition, unless all unused bit positions in the prior art registers are made zero so that complete comparison of variable length words can be accomplished, all of the above methods are limited in that they compare only a specific number of bits of information, no more, no less. To compare less information, one or more circuit elements, i.e., flip flops, must be removed from the circuit; and to compare a larger number of bits of information, one or more circuit elements, that is, flip flops, must be added to the circuit.

The present invention utilizes the phenomena of propagating magnetic domains along a wire which permits an increase in density of controllable bit storage of at least several orders of magnitude, and a decrease in power consumption and dissipation by a like amount over the prior art comparators. Indeed, no power is required by systems using shifting magnetic domains when no movement is required. To add more binary bit capacity, all that must be added are more turns of a magnetizable wire, and extension of the domain propagating means. Since the binary information is stored in the form of variously polarized magnetic domains along a wire, the amount of information that can be stored may be varied to accommodate a wide range, being dependent only upon the length of the wire. Therefore, it is an object of this invention to provide a digital information comparator incorporating the principle of the magnetic shift register.

It is another object of this invention to provide a digital information comparator having a variable bit information capacity.

It is a further object of this invention to provide a digital information comparator of simple construction and with few circuit elements.

It is still another object of this invention to combine the functions of comparison of information with that of memory so that stored information can be repeatedly compared in various combinations.

Other and more particular objects of this invention will manifest upon study of the following detailed description, when taken together with the accompanying drawing, in which.

Briefly, two embodiments of the present invention will be described. In the first, or preferred, embodiment, two similar magnetic shift registers of generally circular or oval configuration, with matching flat sides, are positioned with flat sides in spaced parallel juxtaposition, and with magnetizable elements of one in matching opposition to corresponding magnetizable elements of the other. Magnetometer means are disposed in the space between each matching set of corresponding magnetizable elements. The magnetometer means is arranged to compare the polarity of the magnetic domains in matching corresponding sections of the magnetizable element in each of the two shift registers. When the polarities of the magnetic domains in the matching corresponding magnetizable elements are such as to cancel out their magnetic effect in the magnetometer means in between, they are considered to match and no signal is emitted from the circuit. When, however, there is a mismatch in polarity for one or more domains in either register, a current pulse is generated signaling the mismatch to either an operator or an electronic device indicating a mismatch. Such an electronic device might be a gating circuit which permits a signal to pass when no signal is emitted from the comparator, while blocking out signals when a mismatch is detected.

The second embodiment of this invention is arranged to incorporate only one magnetic shift register. Where the preferred embodiment of this invention is arranged to compare the digital information in the form of static or stationary magnetic domains in the register, the second embodiment is arranged to compare the digital information serially with respect to time concurrently with an incoming, unknown pattern of digital information. In other words, the incoming, unknown, serially arranged digital information is compared, bit by bit, with the concurrently propagated known or standard pattern of digital information coming from the magnetic shift register. The circuit means associated with the shift register is arranged to generate a pulse of current whenever there is a mismatch in polarity between an incoming unknown bit of information and a known or standard bit of information. In a like manner, as in the preferred embodiment, a matching of digital binary bits of information does not cause a signal to be generated. Additional circuit means is provided to recycle the known or standard information back into the shift register so that it will not be lost after a comparison cycle, and will be available for future comparison cycles.

The general principle of operation of the magnetic shift register device of the type incorporated in the present invention is disclosed in detail in U.S. Patent No. 3,137,845, issued to the applicant June 16, 1964, and U.S. Patent No. 3,447,144, issued to the applicant May 27, 1969, which patents are incorporated herein by reference.

Figure 1:
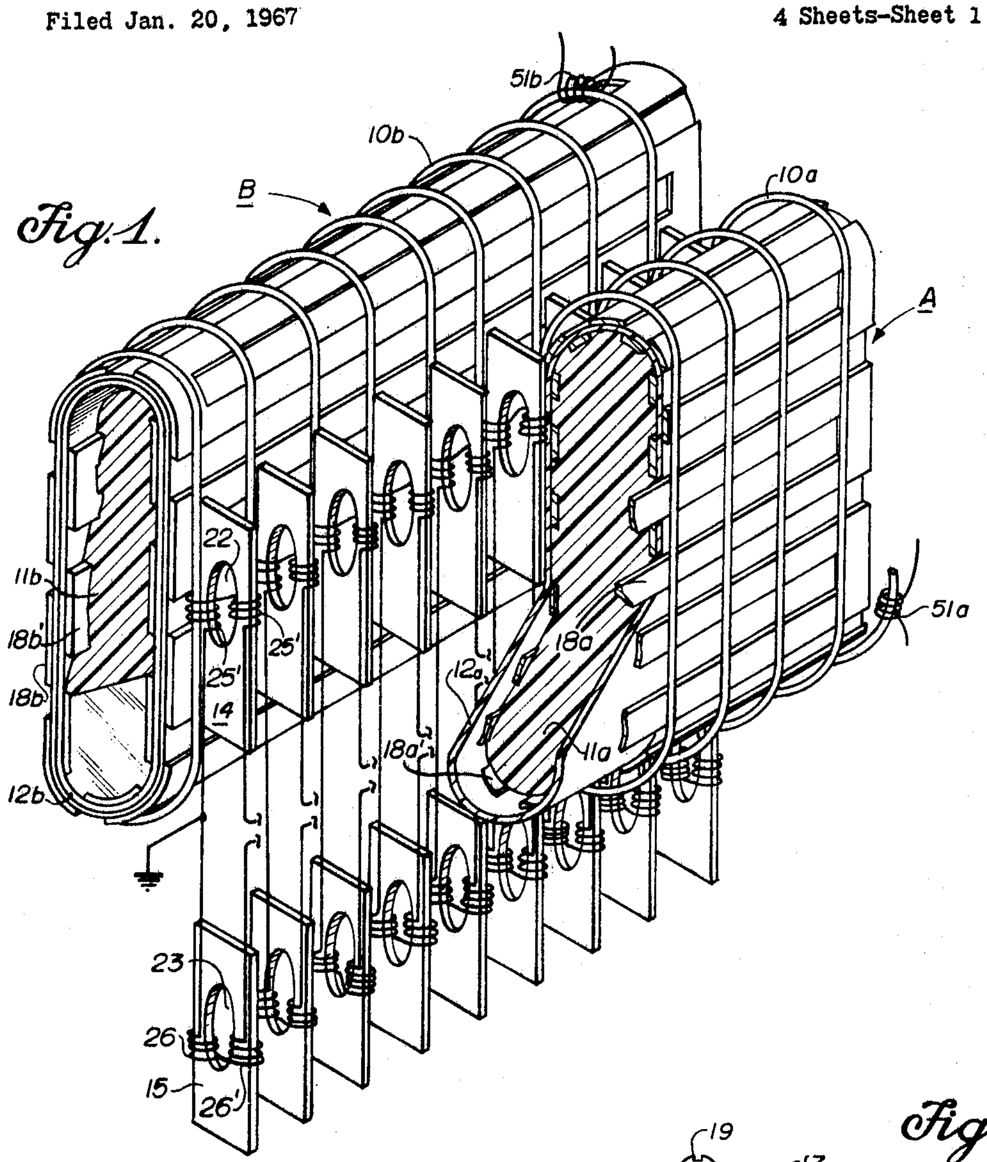
FIGURE 1 is an isometric view of two magnetic shift registers juxtaposed in opposition across a comparator magnetometer assembly to define a first embodiment of the comparator of this invention.

The shift register portion of the preferred embodiment of the present invention differs from the magnetic shift registers previously disclosed only in its being a version of the cylindrical configuration in which the sides of the tubular cylindrical mounting form are flattened to form a flat sided oval tube of a rigid nonconductor, as illustrated in FIGURE 1, for example, shift register A (typically). It comprises the same basic elements as the previously disclosed devices, i.e., an elongated magnetizable element 10*a*, constructed of a suitable ferromagnetic material, in this embodiment defined as a nickel-steel wire wound in an open helix around the outside of mounting oval tube 11*a*, on which is also mounted propagating conductors 18*a* and 18*a'*. Propagating conductors 18*a* and 18*a'*, arranged to lay between mounting oval 11*a* and magnetizable element 10*a*, are disposed longitudinally in alternating parallel spaced array at substantially right angles to magnetizable element 10*a*. Insulating material 12*a*, i.e. paper, sheet plastic or the like, is interposed between propagating conductors 18*a* and 18*a'* to prevent short circuiting of the conductors. A magnetizing means such as write coil 51*a* is arranged around one end of magnetizable element 10*a*, and is used to enter digital information into register A in the form of magnetized domains, with domain walls therebetween.

The shift register portion, supra, of the preferred embodiment of this invention operates through a circuit means (not shown), common in the art and disclosed in detail in the aforementioned references. By energizing conductors 18*a* and 18*a'* with substantially rectangular waves of alternating current which in 18*a* are displaced 90° from similar currents in 18*a'*. A magnetized domain in element 10*a* created by the magnetic field produced around write coil 51*a* will be pushed, i.e., propagated along element 10*a*, away from the magnetic field surrounding conductor 18*a*. This domain motion is effected by moving the domain walls of either end of a domain in the same direction under the influence of the magnetomotive forces generated by the currents in the propagating conductors. By adjusting the intensity of the magnetic field surrounding propagating conductors 18*a* and 18*a'*, the velocity of propagation of the magnetic domain walls along element 10*a* may be controlled. By adjusting the magnetic field frequency in conjunction with the magnetic field intensity to allow sufficient time to propagate the magnetized domain wall to a point just beyond conductor 18*a*, the process may be repeated, but in this case, by energizing conductor 18*a'* to propagate the magnetized domain further along element 10*a*. Thus by synchronously alternating the current flowing in conductor 18*a* and 18*a'*, a traveling wave magnetic field is created which is cyclicly varying in intensity and rotating about mounting oval 11*a*, propagating in unison the magnetic domains serially established in magnetic element 10*a* by write coil 51*a*. It shoud be noted that the rate of propagation of information can be varied from zero to the rate which is limited by the intensity of the propagating fields. Furthermore, the information can remain in any position at the end of a propagation cycle without current flowing in the propagating conductors.

Figure 3:
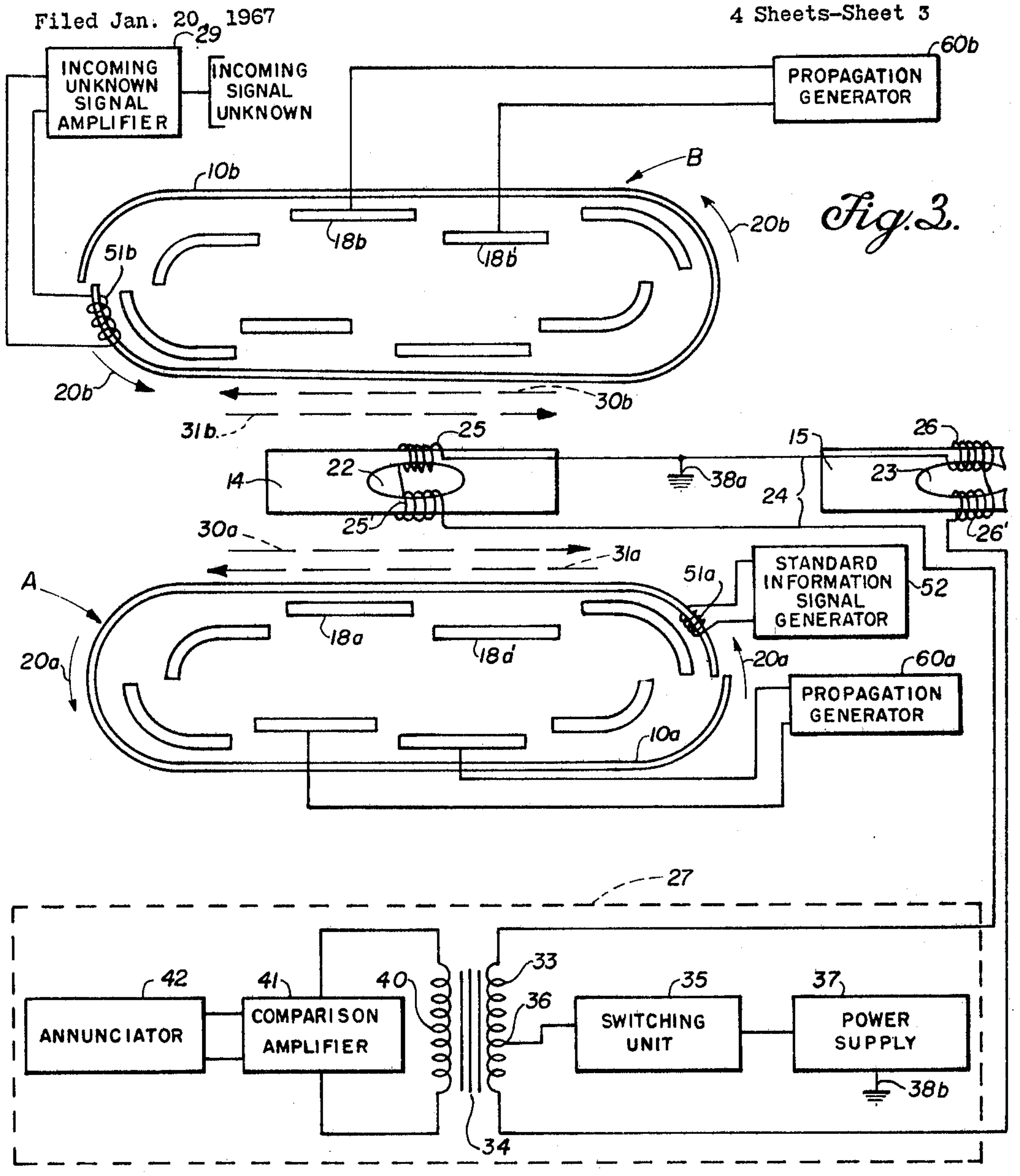
FIGURE 3 is a simplified section through the embodiment of FIGURE 1, showing the arrangement of the basic parts and representing the stored binary digital information, and including, for illustration purposes, a simplified circuit diagram with which the digital information is detected and compared.

The first, or preferred, embodiment of the comparator of this invention is illustrated in FIGURES 1 and 3. The registers are designated A and B with identical corresponding parts of each register identified by reference numerals followed by "*a*" or "*b*," associating the part with shift registers A or B respectively. It will be seen that two identical oval shift registers A and B are disposed with straight sides parallel in spaced relation, and defining a space therebetween with corresponding magnetizable elements 10*a* and 10*b* arranged opposite and parallel to each other. A plurality of generally rectangular elongated magnetometer comparator plates 14 are interposed in said space between registers A and B with opposing edge surfaces coextensive in close parallel proximity to corresponding straight turn portions of magnetizable elements 10*a* and 10*b*. The comparator plates are made of ferromagnetic material, preferably a magnetically soft ferrite type magnetic material.

Corresponding to each magnetometer comparator plate 14, and made to be as nearly identical as possible in magnetic characteristics is magnetometer compensator plate 15, whose purpose is to compensate for any stray magnetic field which might affect magnetometer comparator plate 14, e.g., earth's magnetic field, direct current magnetic fields, large nearby masses of ferromagnetic materials, etc.

Figures 4, 5, 8:
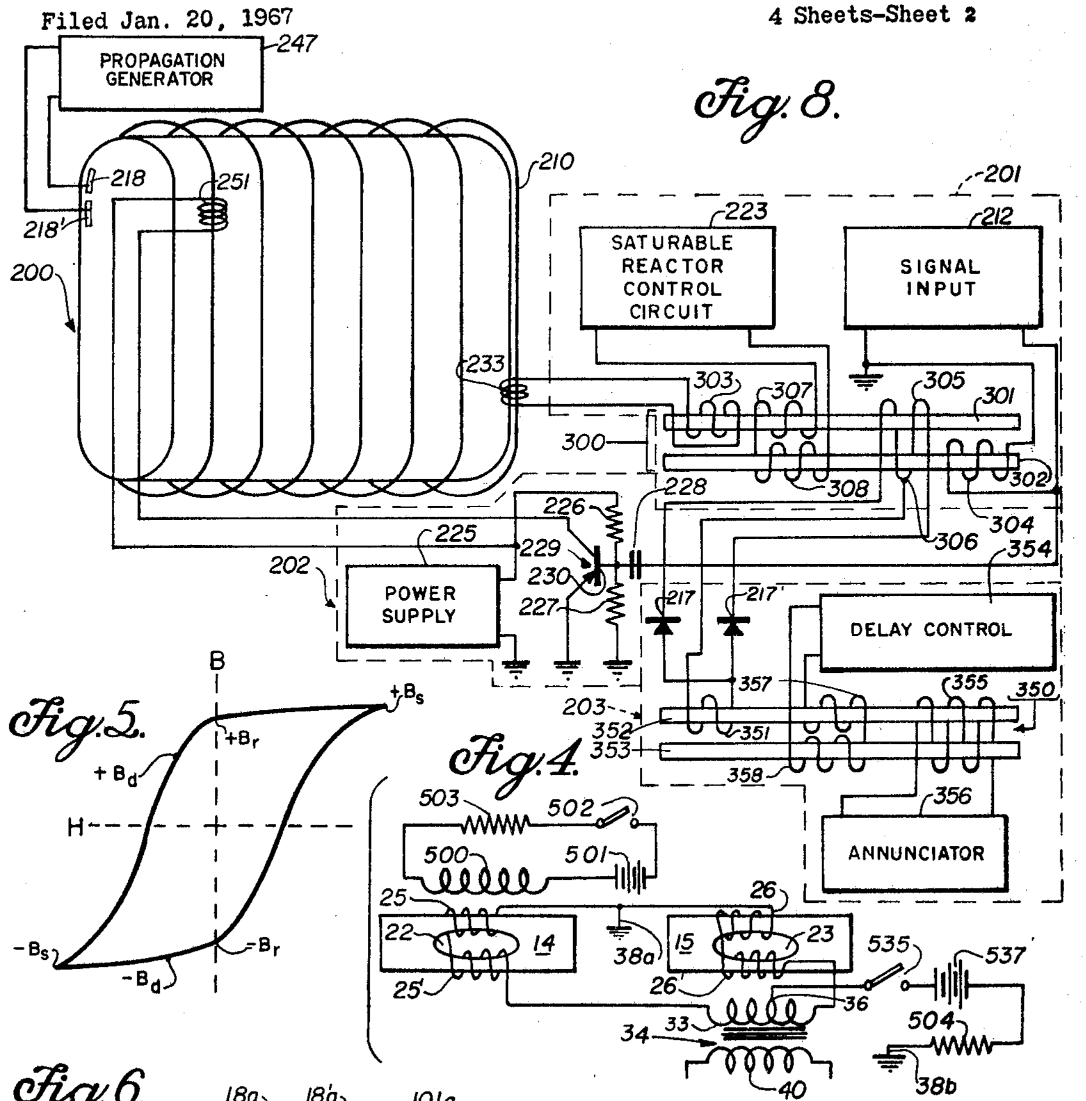
FIGURE 4 is a diagrammatic illustration to illustrate the operation of the magnetometer comparator plate.
FIGURE 5 illustrates the hysteresis characteristics of the material used in the magnetometer comparator plate of FIGURE 4.
FIGURE 8 illustrates a second embodiment of a comparator in accordance with this invention, incorporating a single magnetic shift register with circuits for detecting, comparing and recycling the digital information.

Comparator plate 14 and compensator plate 15 are fabricated from a magnetically soft ferrite into a thin ferromagnetic plate. The thin wall surrounding holes 22 and 23 must have equal magnetic cross sections in order that unequal voltages will not be induced in coils 25, 25′, 26 and 26′ during a change of current therein. The more nearly the comparator plates 14 and compensator plates 15 are identical, the more precise will be the readout and discriminating capability of the device. One method for making the plates identical is to compare the magnetization characteristics of each plate with that of a standard plate and remove material, e.g. by abrasive blasting, until the same magnetic properties are obtained. FIGURES 4, 5, 6 and 7 are more detailed diagrams, and illustrate operation of the magnetometer system which is incorporated in FIGURE 1. In FIGURE 4, two plates, 14 and 15, of magnetically soft ferrite or Permalloy, having the same spatial orientation, but displaced from one another, are arranged so that one plate 14 is in the region of the field to be detected, and the other plate 15 is not. Each plate has a centrally located hole 22 and 23. The thinner walls along the edges of the holes have substantially equal magnetic cross sections. Coils 25, 25′ and 26, 26′ are wound through each hole, having equal numbers of turns about each thin wall. One end of each coil is connected to ground or common 38a, the other ends are connected to the primary 33 of transformer 34, having a center tap 36. The center tap is connected through a switch 535 to a voltage source 537, e.g., battery, power supply, etc., which returns through a current-limiting resistor 504 to ground or common 38b.

Referring to the hysteresis curve of FIGURE 5, when switch 535 is closed, sufficient current flows to coils 25, 25′ and 26, 26′ to magnetize the thin walls in each magnetometer plate 14 and 15 to saturation: $+B_s$ and $-B_s$ for the upper and lower walls respectively. When switch 535 is open, the magnetic fields in the walls will return to $B_r$ and $-B_r$ which are their residual conditions. If switch 535 is closed again, saturation is again produced in the walls surrounding holes 22 and 23. The change in field in all walls will be equal, and equal voltages will be generated across the coils so that the potentials at the terminals of primary 33 of transformer 34 are equal and no voltage is induced in the secondary coil 40 of transformer 34.

If switch 535 is opened, the fields will return to $B_r$ and $-B_r$ and again the potentials will be equal and no voltage induced in secondary coil 40. If now switch 502 is closed, connecting the battery 501 to the current-limiting resistor 503 to the coil 500 which is relatively near comparator plate 14 and far from compensator plate 15, some of the lines of flux from the magnetic field from coil 500 will pass through comparator plate 14, causing the fields in the walls to change to $B_d$ and $-B_d'$. If switch 502 is now opened, $B_d$ will remain substantially the same. However, $-B_d'$ will return to $-B_r$. Therefore, notwithstanding whether switch 502 is opened or not after it is once closed, subsequent closing of switch 535 will cause all the thin walls to go to saturation and, because the flux changes are now unequal, unequal voltages will be induced across coils 25, 25′ and 26, 26′, causing a potential difference across coil 33 and in turn inducing a voltage across secondary coil 40.

It is to be noted that a magnetomotive force acting equally on both comparator plate 14 and compensator plate 15, such as the earth's magnetic field, causes equal disturbances so that equal values of $B_d$ exist and no output is detected.

Figure 6:
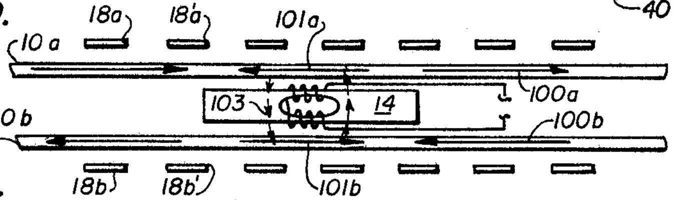
FIGURE 6 illustrates diagrammatically the magnetometer operation of FIGURE 1 for a matching condition.

FIGURE 6 is a simplified illustration of a single magnetometer element wherein magnetometer comparator plate 14 is juxtaposed between a single shift register wire 10a and 10b of registers "A" and "B" respectively of FIGURE 1. The arrows 101a and 101b are indicative of the polarity of the magnetic domains, and illustrate the storage of a "1" in both registers "A" and "B." The head of the arrow may be assumed to be the north magnetic pole. It is to be noted that the polarity of the propagation and write current are selected to reverse the polarity of corresponding domains in the two registers to produce the illustrated magnetic polarities. It is obvious by inspection that the fields from the domains in 10a and 10b cancel their influence on comparator plate 14. In fact, the domains opposite each other act as part of the magnetic circuit represented by dotted arrow 103 for the other, as the return path for the magnetic flux of each, thus bypassing comparator plate 14. It will also be noted that the length of each domain is at least the width of two propagating conductors, e.g. (18a and 18a′) (18b and 18b′).

Figure 7:
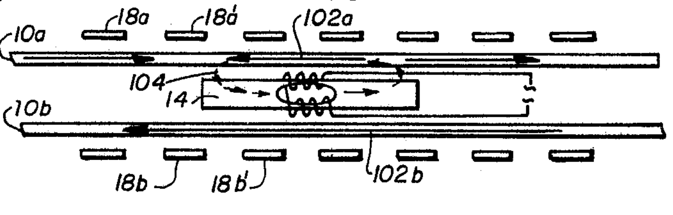
FIGURE 7 illustrates diagrammatically the operation of the magnetometer of FIGURE 1 for a mismatch of information.

FIGURE 7 is a simplified illustration of a single magnetometer element similar to FIGURE 5, however, with the storage of a "1" in shift register wire 10a indicated by arrow 102a and a "0" in shift register wire 10b indicated by arrow 102b. Since there is no equal and opposite magnetic domains in shift register wire 10b to match the one in shift register wire 10a, the flux path represented by dotted arrow 104 now follows the path of least reluctance through comparator plate 14, thus causing the walls around hole 22 to become magnetized to a value illustrated in FIGURE 5 at $B_d$ and $-B_d'$. As a consequence, a pulse of current through coils 25, 25′ and 26, 26′ will produce a potential across primary coil 33 (FIGURE 4) of transformer 34, and a voltage pulse will thus be induced in secondary coil 40.

Figure 2:
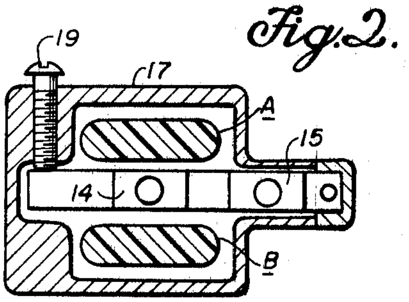
FIGURE 2 is a section through an assembled comparator, showing in more detail the method of arrangement and housing of the component parts of the device of FIGURE 1.

A vertical transverse section of the assembled comparator of the above configuration is illustrated in FIGURE 2. Housing 17 encloses the two shift registers A and B between which are situated comparator plates 14 and compensator plates 15. Adjustment screw 19 is provided, one for each set of comparator and compensator plates, 14 and 15, to adjust their distance between the oval shift registers A and B in order to equalize the magnetic field acting upon compensator plate 14 by the magnetized domains in magnetizable elements 10a and 10b, respectively, of registers A and B.

Referring now to FIGURE 3, in particular it will be noted that this is a simplified illustration of the preferred embodiment of this invention, showing only the propagating conductors 18a and 18a′, and 18b and 18b′, respectively. Only one turn of magnetizable element 10a and 10b is shown in this simplified illustration, with arrows 20a and 20b indicating the direction of propagation of magnetic domains around ovals 11a and 11b, respectively, along magnetizable element 10a and 10b. Dashed arrows 30a, 31a, 30b and 31b immediately adjacent respective portions of magnetizable elements 10a and 10b are indicative of the length and polarity of the magnetized domains in elements 10a and 10b. In operation, only one domain of one polarity will occupy one turn of magnetizable element 10a and 10b, thus arrows 30a and 31a for element 10a are mutually exclusive. In a like manner, arrows 30b and 31b for element 10b are also mutually exclusive. For the purpose of this disclosure, the head of each arrow will be considered the north magnetic pole, while the tail of each arrow will be considered the south magnetic pole. The arrangement of comparator plate 14 juxtaposed between elements 10a and 10b relative to compensator plate 15, is typical for the other comparator and compensator plates aligned further along the length of mounting ovals 11a and 11b. (See FIGURE 1.)

Proximate the center of both comparator plate 14 and compensator plate 15 is a hole 22 in comparator plate 14 and a hole 23 in compensator plate 15, through which passes conductor 24 to form coil 25 about the periphery of hole 22 at one side of comparator plate 14, and then to form coil 25′ about the periphery of hole 22 on the opposite side of comparator plate 14. The turns of coil 25 and 25′ are arranged to produce additive magnetic fields, i.e., the magnetic field in comparator plate 14 around hole 22 is continuous, i.e., circular, thus comparator plate 14 does not become magnetically polarized when coils 25 and 25′ are energized. The configuration of compensator plate 15 is identical to comparator plate 14, with conductor 24 coming from coil 25 on comparator plate 14 to coil 26 on one side of hole 23 in compensator plate 15, thence to coil 26′ on the opposite of hole 23 in compensator plate 15, thence with its other end going to comparator circuit 27. Between coils 25 and 26, conductor 24 is connected to ground 38a. The ends of conductor 24 coming from coils 25′ and 26′ are connected in comparator circuit 27 to opposite ends of center tapped primary coil 33 of comparison transformer 34.

One side of switching unit 35, e.g., a knife switch, vacuum tube, transistor or the like is arranged to interrupt the flow of current, and is connected to center tap 36 of transformer coil 33, while the other side of switching unit 35 is connected to a source of current such as power supply 37, which may be a battery, D.C. rectifier or the like, which is grounded through power supply grounding conductor 38b.

Secondary coil 40 of transformer 34 is connected to comparison amplifier 41 which may be any suitable amplifier common in the art. The amplified output of amplifier 41 is in turn connected to annunciator 42 or other like circuit means to indicate whether or not a pulse of current corresponding to either a match or mismatch of polarities of magnetic domains is generated when switching unit 35 stops the flow of current through primary coil 33 of transformer 34.

To compare digital information by means of the above described apparatus, a standard or given pattern of binary information is entered in magnetic shift register A by means of write coil 51a in conjunction with standard information signal generator 52. The detailed technique for entering the information into magnetizable element 10a is described in detail in the references cited supra. Briefly, propagation generator 60a connected to propagation conductors 18a and 18a′ is energized to cause a magnetic field described supra to rotate in the direction of arrows 20a. Write coil 51a is energized by a pulse of current. The direction of flow of the pulsed current determines the polarity of the resulting magnetized domain in magnetizable element 10a. For convenience in this disclosure, a binary "bit" of information is represented by a "1" or a "0" corresponding to the polarization of the magnetic domain in magnetizable element 10a. For example, a "1" is represented by a magnetic domain polarized so that the north arrow faces the direction of propagation, and a "0" is represented by a magnetic domain polarized so that the south pole faces the direction of propagation. Thus arrows 31a and 31b represent "1," while arrows 30a and 30b represent "0."

After the desired pattern of 1 and 0 bits of information is serially entered on magnetizable element 10a, all domains are arranged to stop on the side of register A immediately adjacent comparator plate 14. Shift register A, holding the standard or given pattern of digital information, is now ready to have this information compared.

At any time after a standard pattern of information is established in shift register A, an unknown pattern of digital information may be entered in shift register B. The technique for entering this information is similar to the technique used for register A. Propagation generator 60b connected to propagation conductors 18b and 18b′ is energized to cause the magnetic field described supra to rotate in the direction of arrow 20b. Write coil 51b is energized by a pulse of current from incoming unknown signal amplifier 29 and the magnetized domain is established in element 10b. After the unknown pattern of 1 or 0 bits of information is established in element 10b, all domains are arranged to stop on the side of register B immediately adjacent comparator plate 14. In this arrangement, the magnetic fields of the domains in elements 10a and 10b will each have their lines of force intersecting comparator plate 14.

In a shift register, a stationary bit of information occupies a region of magnetic wire which spans four propagating conductors. If the bit is a one, there are two domains of opposite polarity, each spanning two conductors. If the bit is a zero, a single domain spans all four conductors and extends over at least two more conductors in an adjacent bit position. A series of sequential ones will then be composed of a string of domains of alternating polarity, and a sequential series of zeros will consist of one long domain in all zero bit positons, plus two conductor spaces in one of the adjacent one positions at one end of the string of zeros.

Suppose, for example, the information stored in register A is polarized in the direction of arrow 31b, representing a "1," while the information stored in register B is polarized in accordance with arrow 30a, representing "0." In such case, the magnetic fields would be unbalanced, and their magnetic lines of force penetrating comparator plate 14 would cause plate 14 to become magnetically polarized, as previously described in FIGURE 7.

To prepare to make a comparison of information, switching unit 35 is energized to cause a current to flow through conductor 24, be equally divided between coils 25 and 25′ of comparator plate 14, and coils 26 and 26′ of compensator plate 15, and be of sufficient magnitude to magnetize both comparator plate 14 and compensator plate 15 to within a small percentage of saturation.

To actually make the comparison, switching unit 35 is opened, thus abruptly stopping the flow of current. The magnetic field surrounding coils 25, 25′, 26 and 26′ will decay. Since the magnetic field has caused compensator plate 14 to become polarized, the magnetic flux in one thin wall surrounding hole 22 is decreased below its normal residual value, and consequently an unbalanced voltage results between coils 25, 25′ and 26, 26′ causing an unbalanced current to flow through primary coil 33 of transformer 34. When the center tap current is reestablished, a similar unbalanced voltage results. The resulting pulse of current through primary coil 33 will in turn cause a voltage to be developed across secondary coil 40, which is in turn amplified by comparison amplifier 41. The output signal from comparison amplifier 41 is then used to activate an annunciator 42, or connected to a computer or other device to signal that the binary information does not match. It can also be seen that a "0" stored in register A compared with a "1" stored in register B will also produce an additive magnetic field, with the mismatch detected in an identical manner described above.

It can be seen that in the above method of making a comparison, it is the collapsing or dynamic change in the magnetic fields surrounding coils 25, 25′, 26 and 26′ which generate the unbalanced current through primary coil 33. A comparison can also be made with the rising magnetic field as produced when switching unit 35 is energized to produce a rapidly rising inrush current. In such case, a larger signal is produced.

Thus, by the use of two magnetic shift registers, various given or desired standard patterns of digital binary information may be compared with unknown patterns of binary information. It can be noted in this system that many turns of storage wire may be placed between comparators in practice, and very large quantities of information may be stored thereon. Also, because the systems are reversible, many standard signals can be compared with any unknown, for example, to identify the patterns of the letters of the alphabet. Repeated comparisons can be made in two signal trains by stopping one shift register for one bit propagation time, while the other register continues, thus searching for a bit between two signals which may, by the nature of the signals, have unknown phase relationships.

A second embodiment of this invention, illustrated in FIGURE 8, utilizes only a single magnetic shift register 200, in combination with a comparator circuit 201, a recycling circuit 202, and a delay readout circuit 203. This system is to compare real time data with stored data. The real time signals may be subsequently stored for later comparison, as for example in a moving target identification system, particularly using sonar systems where the propagation rate is too slow for electrical delay.

The shift register 200 used in this embodiment may be of either oval (as shown), cylindrical, or flat, or other configuration, and still possess the essential components of the basic shift register, e.g., elongated magnetizable element 210, propagation conductors 218 and 218', propagation generator circuit means 247, write coil 251, and read or sense coil 233.

The over-all operation of this embodiment is to serially read out the stored digital data in shift register 200 simulaneously with an unknown serial pattern of digital data, and serially introduce both signals into comparator circuit 201. The stored signal may be generated by a standard signal generator or may be recorded from the source of unknown signals, such as unknown signal input 212, at an earlier time. It may also be re-recording of a standard signal or, in certain special cases, a recording of the differences between the stored signal and one subject to comparison. The basic principle employed is that of using a pulsed magnetic amplifier to produce an output at a particular time in response to an input received at some indeterminate earlier time. If more than one input has been received in the interval between output pulses, the system will produce an output if the inputs have one polarity. Common polarity of all input signals can be provided by rectifying any source. The output pulses can have considerably greater energy than the inputs, provided the saturable reactor control circuit 223 can supply the energy required and provided that between reading pulses, the impedance of the source of control 223 pulses is very high during the receipt of input signals. As a result, perturbations in real time input signals can be accommodated and brought into synchronism with data processing equipment. Furthermore, comparisons between signal trains having large numbers of bits can be carried out over a period of time and any signals indicating a mismatch stored without power consumption until integrated by the processing system.

Figure 9:
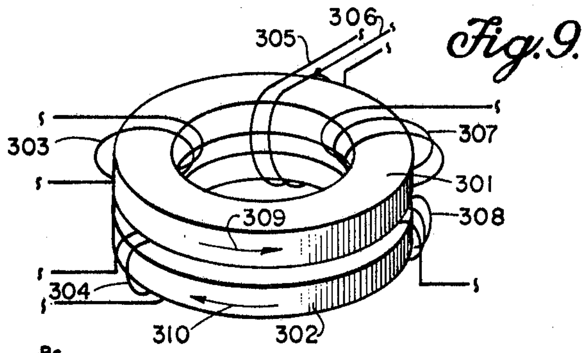
FIGURES 9 and 10 illustrate magnetic amplifier devices and their hysteresis characteristics as employed in the second embodiment of this invention.
Figure 10:
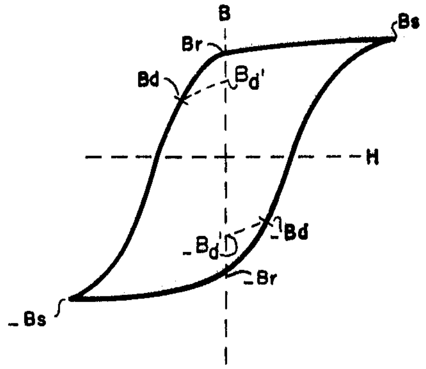

The magnetic amplifiers can have one of a number of configurations. One configuration is shown in FIGURE 9, which is illustrative of magnetic amplifier 300 in circuit 201 of FIGURE 8. It comprises two ferromagnetic rings 301 and 302, having substantially equal magnetic characteristics. Around magnetic ring 301 is wound one input coil 303. Another input coil 304 is wound around ring 302. An output coil 305, having a center tap 306, is wound around both cores. A control winding comprising two coils 307 and 308, wound on rings 301 and 302 respectively, is connected in series in such a way that a current through the winding magnetizes the cores in the opposite direction as indicated by the arrows 309 and 310. The control winding 307 and 308 is subjected to current pulses of sufficient amplitude to magnetize cores 301 and 302 to saturation, or, referring to FIGURE 10, at $B_s$ and $-B_s$. When the current pulse is dissipated, the field in the cores falls back to $B_r$ and $-B_r$ which is the residual magnetic state of each ring. If no input is received before another control pulse passes through coils 307 and 308, both cores are driven to $B_s$ and $-B_s$, and, because the flux changes are equal and opposite, their influence on the output coil 305 is cancelled and no output voltage is generated. If a signal pulse now passes through coil 303 in a direction to reduce the flux indicated by arrow 309, the flux in ring 303 will be driven from $B_r$ to $B_d$ for the rise in the current, and then from $B_d$ to $B_d'$ when the pulse subsides. When the next control pulse occurs, the flux change in rings 301 and 302 will be opposite, but not equal, and the voltage will be induced in the output coil 305. If an input occurs in coil 303 and another in coil 304 in a direction to reduce the residual fluxes in rings 301 and 302 to $B_d$ and $-B_d$, and thence to $B_d'$ and $-B_d'$, not necessarily at the same time, the next control pulse will again cause equal and opposite flux changes in the rings and no output will be generated. It must be noted that the polarity of the output signal will be opposite if only ring 302 is disturbed by current in coil 304 from that caused by a disturbance only in ring 301 by current in coil 303. If coil 305 is center tapped at 306 and appropriately polarized, diodes 217 and 217' (circuit 203, FIGURE 8) connected to its terminals, unidirectional pulses can be delivered to the load which in this case is coil 351 in magnetic amplifier 350. Repeated pulses in the inputs have essentially the same effect as single pulses.

In the comparator of FIGURE 8, two of these magnetic amplifiers are used. The first, amplifier 300, is shown in the comparator circuit 201, and the second, amplifier 350, is in the delay readout circuit 203. In circuit 201, the magnetic amplifier like that shown in FIGURE 9 has one of its two input coils 303 connected to the sense or output coil 233 of the shift register 200. The other input coil 304 is connected to the source of input signals 212. The control winding coils 307 and 308 are connected to a source of control pulses 223. The output coil 305, wound through both cores 301 and 302, has a center tap 306 which is connected to one terminal of an input coil 351 of magnetic amplifier 350 comprising cores 352 and 353 in the delay readout circuit 203. The terminals of coil 305 are connected through the rectifier diodes 217 and 217', to the other terminals of coil 351. The control winding coils 357 and 358 are energized by pulses from delay control circuit 354. The output coil 355 is connected to the annunciator 356 or a comparison output circuit detection means.

The signal input system also supplies the recycling circuit 202. This circuit comprises the input condenser 228 connected to the base of the transistor 229, which is suitably biased by means of the voltage divider comprising resistors 226 and 227, connected between the negative terminals of the power supply 225 and ground. The write coil 251 of the shift register 200 is connected to the negative terminal of transistor 229 and collector 230. The positive terminal of power supply 225 is connected to ground. Signals from signal input 212 are thus amplified by the transistor 229 and passed through the coil 251 to create a magnetic domain on magnetizable element 210; thus a signal may be generated at the end of a word period or any other prescribed time which will indicate whether or not one or more mismatches have occurred.

By properly selecting the length or capacity of shift register 200 and its speed of propagation to match that of trains of digital signals having constant length, successive trains may be examined to determine whether they are like or different. If the length of the shift register is increased by an integral multiple, longer intervals between comparisons may be made. Variations of the basic scheme may be used to perform sophisticated sorting tasks, such as code breaking and the checking of complicated series of operations to insure that deviations in successive operations do not occur.

Figure 11:
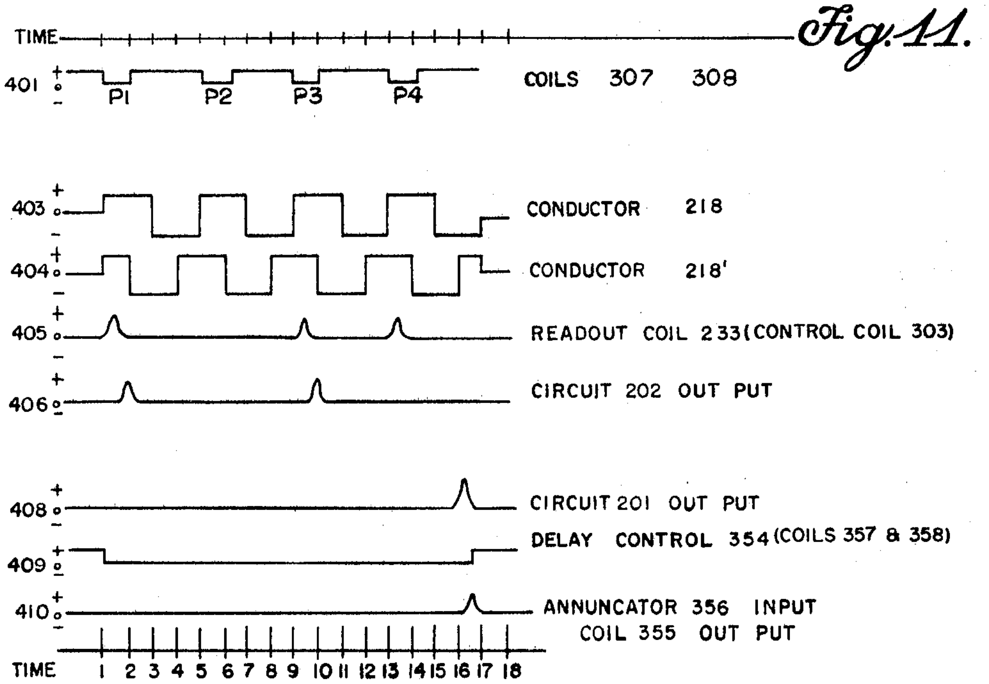
FIGURE 11 illustrates typical wave shapes of electrical signals detected at various points in the circuit of the second embodiment of this invention.

FIGURE 11 shows a timing diagram for comparing 4-bit words. Curve 401 shows current in the control coils 307 and 308 of the comparison magnetic amplifier in circuit 201 derived from the control circuit 223. A four pulse train is shown with each pulse numbered P1, P2, P3 and P4. Curves 403 and 404 illustrate the propagation currents in conductors 218 and 218'. Curve 405 is the current in control coil 303, generated by the signals from pickup coil 233. Curve 406 is the input signal and also the rerecord signal in coil 251. It is to be noted that the fourth pulse position in curve 405 is "1" and in 406 "0," thus indicating a mismatch. Therefore, the output circuit 201, curve 408 is "0" in the first three digit positions where there is a match, but is "1" in the fourth position where there is a mismatch. Curve 409 is the current in coils 357 and 358 from the delay control 354, and produce an output curve 410 in coil 355 as a result of the pulse in curve 408.

It should be noted that a second input coil is not required in the amplifier 350 made of cores 352 and 353, but the double core structure is necessary to make the output "0" when no input is received.

It can be seen also that in the second embodiment of this invention, the standard signal pulses need not be exactly coincident with the unknown signal pulses because there is a finite storage time before the polarity of the pulses are compared. Therefore, in both the first and second embodiments of this invention, a digital information comparator is described which takes a known pattern of digital information and compares it with an unknown pattern of digital information, and produces a pulsed signal when the patterns do not match, and no signal when they do match.

Although the foregoing embodiment have been described in detail, there are obviously many other embodiments and variations in configuration which may be made by a person skilled in the art, without departing from the spirit, scope or principle of this invention.

What is claimed is:

1. A magnetic shift register comparator comprising at least one magnetic shift register means, including means for producing and propagating magnetic domains along a magnetizable storage element, and circuit means associated with said one magnetic shift register for comparing digital information contained therein with digital information from a source exterior to said shift register comprising a second magnetic shift register means, both of said shift register means having a magnetic propagation element means juxtaposed in spaced parallel relation with like magnetic propagation element means of the other magnetic shift register, comparator magnetometer means disposed in the space between said juxtaposed propagation element means of said shift register means and sensing corresponding portions thereof simultaneously, and difference measuring circuit means associated with said comparator magnetometer means for detecting differences in magnetization between corresponding portions of said magnetic propagation elements.

2. The apparatus as defined in claim 1, wherein said comparator magnetometer means comprises a plurality of ferromagnetic comparator plates interposed in said space between said like juxtaposed propagation element means of said shift register means with opposing edge surfaces coextensive in close parallel proximity thereto and said plates having face surfaces transversely between said opposing edge surfaces defining penetrations through said face surfaces, said face surfaces juxtaposed parallel between and within the magnetic field of like magnetic propagation element means of said magnetic shift registers, a first coil means about the plate portion transversely outward from a peripheral edge of said penetration of each of said plates, a second coil means about the plate portion outwardly from the opposite edge of said penetration of each of said plates, compensator plates associated with respective ones of said comparator plates and of like configuration as said comparator plates, said compensator plates disposed in parallel spaced relation to said comparator plates outside the magnetic field of said magnetic propagation element means, said compensator plates having face surfaces defining penetrations therethrough, a third coil means about the plate portion outwardly of a peripheral edge of the penetration of each of said compensator plates, a fourth coil means about the outwardly extending plate portion of the opposite edge of the penetration of each of said compensator plates, and circuit means connecting said first, second, third and fourth coil means in series.

3. The apparatus as defined in claim 1, wherein said difference measuring circuit means associated with said magnetometer comprises a transformer means, a center-tapped primary coil means, and secondary coil means associated with said transformer, a current interrupting means connected to the center tap of said primary coil, amplifier means connected to the ends of said secondary coil, and circuit means connecting the ends of said primary coil to said magnetometer.

4. A magnetic shift register comparator comprising at least one magnetic shift register means, including means for producing and propagating magnetic domains along a magnetizable storage element, and circuit means associated with said magnetic shift register comprising recycling circuit means for recycling digital information contained therein and comparator circuit means for serially comparing digital information contained in said magnetic shift register with digital information from a source exterior to said magnetic shift register for generating an electrical signal indicative of whether or not the digital information contained in said magnetic shift register matches the digital information from the source exterior to said magnetic shift register, wherein said comparator circuit means comprises saturable reactor means, saturable reactor control means connected to said saturable reactor means, and rectifier means connected to said saturable reactor means, said saturable reactor means comprising a first annular ferromagnetic ring, a second annular ferromagnetic ring axially aligned with said first annular ring and with annuli parallel, first coil means wound around said first annular ring, second coil means wound around said second annular ring in opposing direction to said first coil and series connected to said first coil, and a plurality of coil means wound commonly around both said first and second annular rings.

References Cited

UNITED STATES PATENTS

| | | | |
|---|---|---|---|
| 2,967,294 | 1/1961 | Moerman | 340—146.2 |
| 2,979,695 | 4/1961 | Tyrlick | 340—146.2 |
| 3,137,845 | 6/1964 | Snyder. | |
| 3,166,735 | 1/1965 | Clark | 340—146.2 X |
| 3,284,783 | 11/1966 | Davis. | |

MALCOLM A. MORRISON, Primary Examiner

R. S. DILDINE, Jr., Assistant Examiner

U.S. Cl. X.R.

340—174